July 9, 1963   W. DEMUTH   3,096,685
DEVICE FOR MACHINING THE FLANKS OF SPUR AND HELICAL GEARS
Filed July 7, 1959   3 Sheets-Sheet 1

INVENTOR
WALTER DEMUTH
By Wenderoth, Lind &
Ponack
Attys.

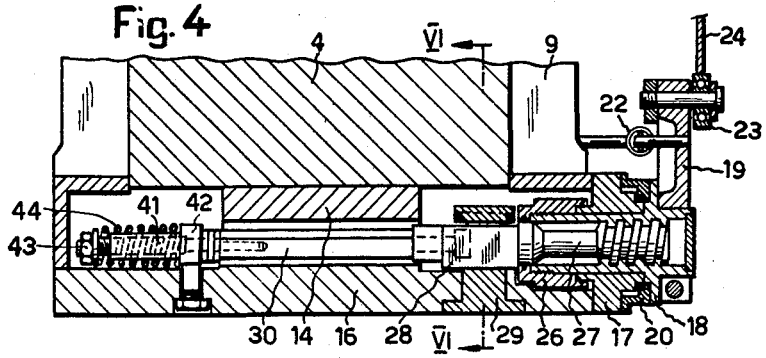
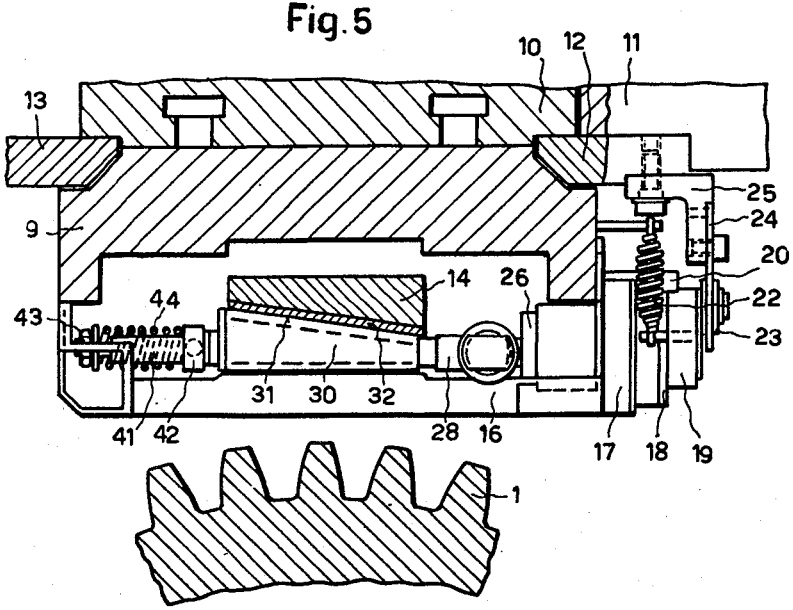
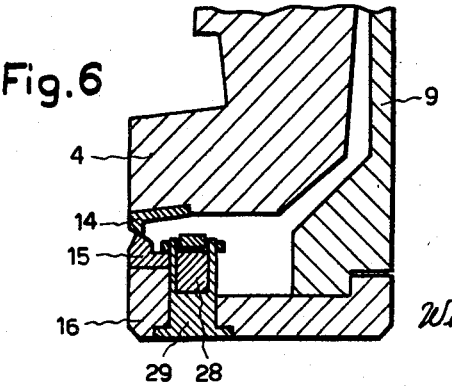

July 9, 1963  W. DEMUTH  3,096,685
DEVICE FOR MACHINING THE FLANKS OF SPUR AND HELICAL GEARS
Filed July 7, 1959  3 Sheets-Sheet 3

INVENTOR
WALTER DEMUTH
By
Wenderoth, Lind & Ponack
Attys.

United States Patent Office 3,096,685
Patented July 9, 1963

3,096,685
DEVICE FOR MACHINING THE FLANKS OF
SPUR AND HELICAL GEARS
Walter Demuth, Wallisellen, Switzerland, assignor to Maag Gear Wheel & Machine Company Limited, Zurich, Switzerland
Filed July 7, 1959, Ser. No. 825,479
Claims priority, application Switzerland July 21, 1958
7 Claims. (Cl. 90—1.6)

The present invention relates to machine tools for machining gears to produce flanks on spur and helical gears deviating from the theoretical shape along the width of the teeth. The relative movement of the tool and the gear in the direction of the width of the teeth serves for initiating the movement producing the deviation. The manner of deviation is controlled by a template.

Such a device has become known on a gear grinding machine for generating the crowning, the grinder disc receiving during its horizontal to-and-fro movement along the width of the teeth an additional up-and-down movement by the aid of a vertical guide which additional movement is derived from a template and imparted through a toothed rack and gear pinion to an eccentric.

The present invention has for an object providing a device solving the aforesaid problem in a different manner.

A further object is to provide a machine tool for machining tooth flanks on spur gears and producing deviations from the theoretical tooth shape along the width of the teeth, comprising the following elements, a machine frame supporting the gear to be machined, a template fixedly attached to the frame, a ram reciprocatingly mounted on the fame, a tool carrier fixed to the ram, a hinged tool holder pivotally mounted on the tool carrier, a tool fixedly attached to the hinged tool holder and in one direction of movement of said reciprocatingly moving ram engaging the gear to be machined, and a follower mechanism mounted in the hinged tool holder and operatively engaging the template, the said mechanism varying the distance of the tool from the axis of the gear to be machined in the course of the movement of the ram in dependence upon the shape of the template.

A further object of the invention comprises in addition the provisions of the following elements, a tool lifting-off means operatively connecting the hinged tool holder to the machine frame and during the movement of the ram in the opposite direction lifting the tool off the gear to be machined, the tool lifting-off means being independent of the said device producing deviations of the shape of the tooth flanks from the theoretical shape.

Preferably the said follower mechanism comprises a wedge rail mounted axially slidable in the tool carrier, a wedge-shaped slide attached to said hinged tool holder in sliding contact with the wedge rail, the wedge rail and wedge-shaped slide when sliding upon one another turning the hinged tool carrier relative to the tool carrier.

The follower mechanism may comprise a threaded spindle connected to the wedge rail, a nut in screw engagement with the spindle journalled rotatably but restrained axially in the hinged tool holder, and a follower lever fixed to the nut and contacting the template. A spring may be provided biasing the wedge rail always in the same direction relative to the hinged tool holder, thereby abolishing any play in the follower mechanism. The latter may comprise a member axially movable but restrained rotationally relative to the hinged tool holder and operatively connecting the threaded spindle to the wedge rail.

A machine tool according to the present invention for the machining of tooth flanks of helical teeth spur gears has its ram mounted adjustably in an angular direction relative to the gear to be machined, the said mechanism varying the distance of the tool from the gear to be machined in the course of the movement of the ram in dependence upon the template taking part in the angular adjustment of the ram relative to the gear to be machined.

With the above and other objects in view the present invention will be clearly understood from the following description of a preferred embodiment thereof given by way of example with reference to the accompanying drawings, wherein:

FIGURE 4 is a vertical part-section on the line IV—IV of FIGURE 1,

FIGURE 5 is a horizontal section on the lines V—V of FIGURE 1 or FIGURE 3,

FIGURE 6 is a section on the lines VI—VI of FIGURE 3 or FIGURE 4,

Figure 1:
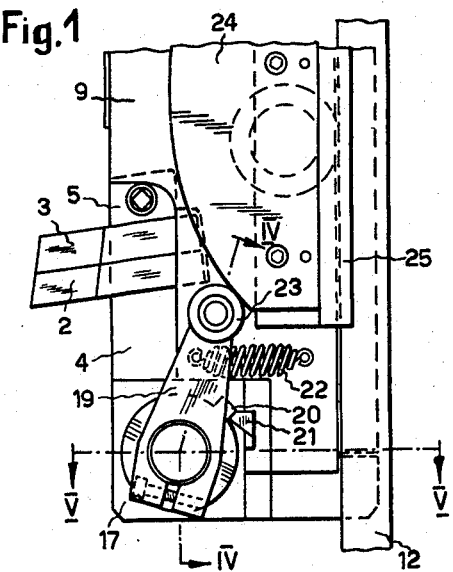
FIGURE 1 is a side elevation of the template and of the tool carrier of a gear cutting machine operating on the generating method for the production of cylindrical gears having straight or helical toothing.
Figure 2:
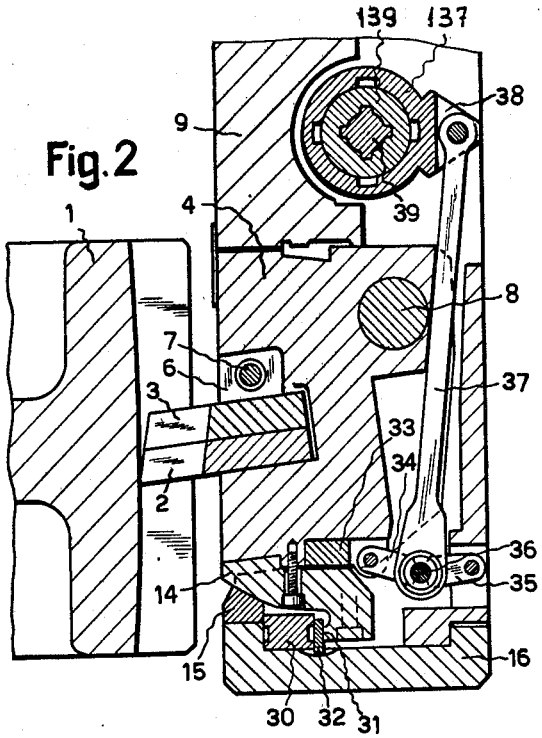
FIGURE 2 is a vertical section on the line II—II of FIGURE 3.
Figure 3:
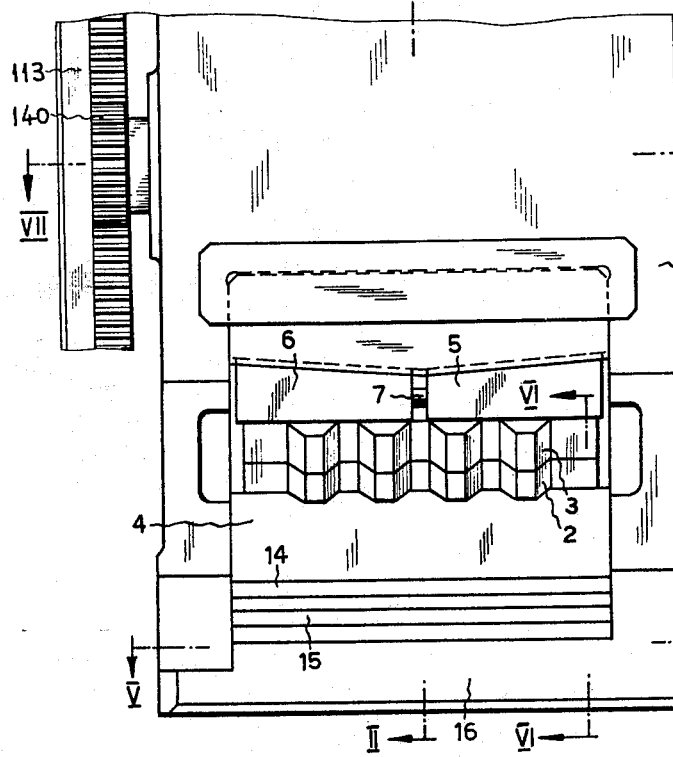
FIGURE 3 is a front elevation of the tool carrier.
Figure 7:
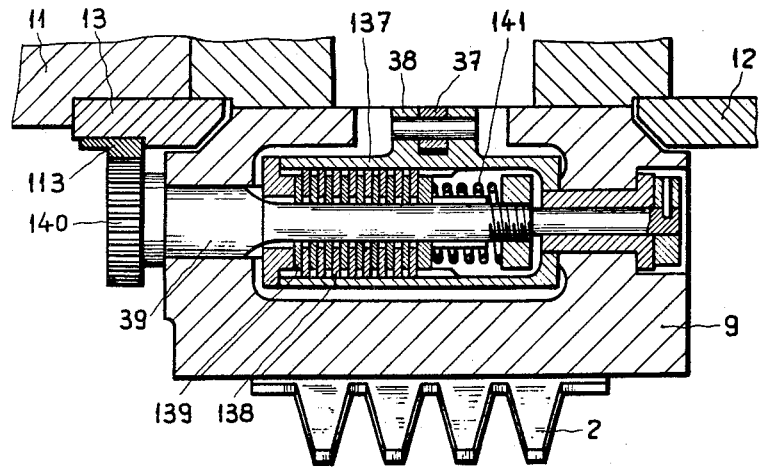
FIGURE 7 is a section on the line VII—VII of FIGURE 3.
Figure 8:
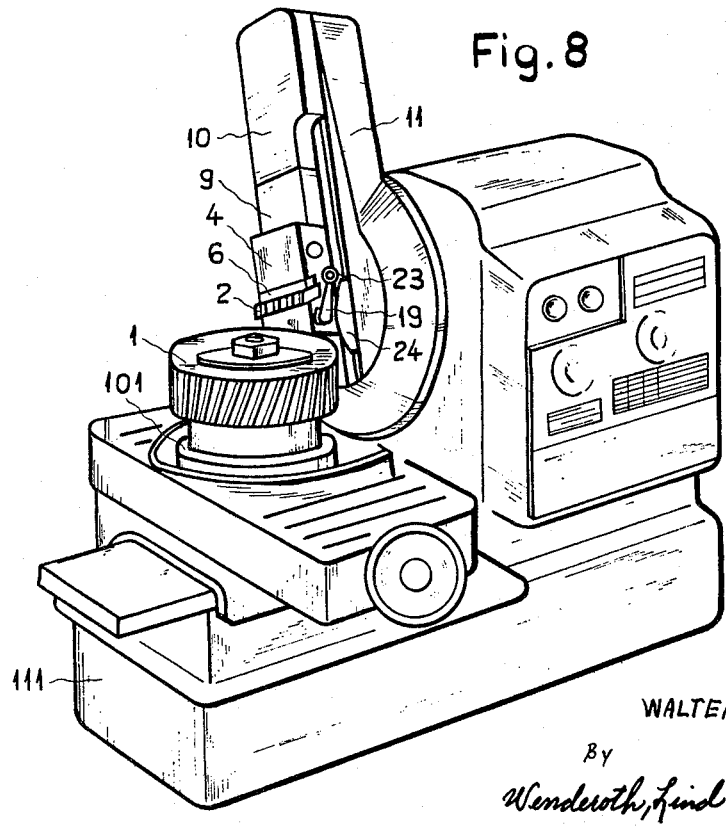
FIGURE 8 is a diagrammatic perspective view of the general arrangement of the gear cutting machine.

The gear 1 to be produced is clamped on a round table 101 (FIGURE 8) having a vertical axis. The rack cutter 2, stiffened by a base 3 (FIGURE 1) is attached together with the latter to the hinged tool holder 4 by the aid of two wedges 5 and 6 drawn towards one another by a tensioning screw 7 (FIGURE 2).

The hinged tool holder 4 is mounted pivotally on a shaft 8 on the tool carrier 9. This tool carrier 9 is fixed to the ram 10 of the tooth cutting machine 111 adjustably in height. The two gibs 12 and 13 (FIGURE 5) guide the ram 10 and are themselves fixed to the slide 11. On the hinged tool holder 4 the wedge-shaped slide 14 is attached by means of screws, the closure ledge 15 fixed to a cover plate 16 covering the gap between the latter and the hinged tool holder 4 and wedge-shaped slide 14, respectively. The cover plate 16 is screwed to the tool carrier 9 and has a flange 17.

In this flange 17 a nut 18 is journalled axially and radially on which nut a rocker lever 19 is clamped. (Accordingly the rocker lever 19 may be turned together with the nut 18, the amplitude of this movement being limited by an abutment ring 20. This abutment ring 20 is fixedly connected to the nut 18 and has a projection which abuts a stop 21 mounted on the tool carrier. A spring 22 pulls the rocker lever 19 with its roller 23 against a template 24, which is in turn mounted on an angle bracket 25 of the gib 12 and is thereby fixedly attached to the slide 11. On the nut 18 a bushing 26 having an inner shoulder is arranged for securing the nut axially.

In the nut 18 engages a threaded spindle 27 which is restrained from rotating by a square head 28. A block 29 permits axial movement of the said square head 28 and accordingly of the spindle 27, but restrains the square head 28 from rotating. To the square head 28 a wedge rail 30 is connected by a T-joint, whereby any axial movement of the threaded spindle 27 is transmitted to the square head 28 and to the wedge rail 30. The wedge rail 30 has a wedge face 31 which through an intermediate plate 32 is in contact with the wedge-shaped slide 14, having a complementary wedge face (FIG. 5). In the wedge rail 30 an axle 41 is mounted, the latter being journalled in a bearing 42. A spring 44, adjustable by the aid of a screw 43, accordingly pulls the axle 41, wedge rail 30, square head 28 and threaded spindle 27 always in the same direction so that any play which may exist between them has no influence on the functioning of these components.

Moreover the hinged tool holder 4 and the tool carrier 9 are connected to one another by a pair of toggle levers 34 and 35 (FIG. 2) articulated to the support 33 and tool holder 4, respectively, as support 33 is fixed on tool holder 4. The middle joint 36 of the toggle levers 34, 35 is connected to a rod 37, which is in turn articulated to a lever 38 forming a projection of a casing 137 of a friction clutch. In this casing friction plates 138 are restrained rotationally, while friction plates 139 cooperating with them are restrained rotationally relative to the tool lifter shaft 39, which is journalled in the tool carrier 9. This shaft 39 carries a spur gear 140 in mesh with a toothed rack 113 fixed to the gib 13 of the slide 11. The plates 138, 139 are axially slidable and forced against one another by a coiled compression spring 141.

When planning the toothing of the gear 1, the ram 10 together with the tool carrier 9, the hinged tool holder 4 and accordingly also with the cutter rack 2 moves to-and-fro along the width of the gear 1. The gear 140 mounted on the tool lifter shaft 39 rolls during this movement on the toothed rack 113 fixed to the gib 13 of the machine frame 11, and causes the lever 38 forming part of the casing 137 of the friction clutch to rock with an angular amplitude limited by stops (not shown) between an upper position during the working- or down-stroke and a lower position during the return- or up-stroke. The rod 37 performs the same movement. Accordingly, the rack cutter is forced in the direction towards the gear by the action of the toggle levers 34 and 35 during the working stroke, and is lifted off during the return stroke. The hinged tool holder 4 with the tool is turned about the axis of the shaft 8.

The limitation of the movement of the tool in the direction towards the gear during the working stroke is effected through the wedge-shaped slide 14 fixed to the hinged tool holder 4, which meets through the intermediate plate 32 with the wedge face 31 of the wedge rail 30. Thereby also the position of the rack cutter during the working stroke is made dependent on the axial position of the wedge rail 30, which is in turn influenced by the template 24 through the square head (being a member which is only axially movable) the spindle 27, the nut 28, the rocker lever 19 and the roller 23. Since on the stroke of the rack cutter also the roller 23 is forced by the spring 22 against the template 24 and rolls on the same, and this template 24 is stationary, each position of the rack cutter in height or position relative to the width of the tooth corresponds to a certain position in the direction towards the gear, depending on the shape of the template. With a template omitted or one of short length, the rocker lever 19 is pulled against the stop 21, which accordingly limits the foremost working position of the tool.

The limitation of the angular amplitudes of the follower lever 38 has the object of limiting the lifting off of the cutter to a certain magnitude, while the feed of the rack cutter is limited by the wedge-shaped slide 14. The lifting off of the cutter as such accordingly takes place independently of the actual working position of the tool.

The various working positions of the rack cutter relative to the gear to be machined in the course of the width of the tooth correspond likewise to different distances from the axis of the gear. With a constant distance of the tool from said axis theoretically correct tooth flanks are generated while the deviations of this distance from the axis in dependence upon the template in the course of the width of the tooth involve corresponding deviations of the tooth flanks. Very frequently so-called crowned tooth flanks are generated by the device according to the invention. On the other hand it is also possible without difficulty to generate tooth flanks having a negative crowning or slightly conical spur gears, as well as any other deviation desired from the theoretical shape.

When producing spur gears having helical toothing the direction of movement of the ram is adjusted to the helix angle desired of the toothing, the template and the remaining follower mechanism following up this adjustment to the angle of the toothing.

While I have described herein and illustrated in the accompanying drawings what may be considered a typical and particularly useful embodiment of my invention, I wish it to be understood that I do not limit myself to the particular details and dimensions described and illustrated for obvious modifications will occur to a person skilled in the art.

I claim:
1. A machine tool for the machining of tooth flanks on spur and helical gears and producing deviations from the theoretical tooth shape along the width of the teeth, comprising in combination: a machine frame for supporting the gear to be maintained, a template fixedly attached to said frame, a ram reciprocatingly mounted on said frame, a tool carrier on said ram, a hinged tool holder pivotally mounted on said tool carrier for holding a tool to engage the gear to be machined in one direction of movement of said ram and a follower mechanism comprising a pair of cooperating wedges mounted in said hinged tool holder controlled by said template to vary the distance of said tool from the axis of the gear to be machined in the course of the movement of said ram in dependence upon the shape of said template.

2. A machine tool as claimed in claim 1 wherein a tool lifting-off means operatively connects said hinged tool holder to said machine frame and during the movement of said ram in the opposite direction lifts said tool off the gear to be machined, said tool lifting-off means including toggle means connected to said tool holder.

3. A machine tool for the machining of tooth flanks on spur and helical gears having a device producing deviations from the theoretical tooth shape along the width of the teeth, comprising in combination: a machine frame supporting the gear to be machined, a template attached to said frame, a ram mounted on said frame for reciprocating movement in an angularly adjustable direction relative to the gear to be machined, a tool carrier fixed to said ram, a hinged tool holder pivotally mounted on said tool carrier holding a tool for engaging the gear to be machined in one direction of the movement of said reciprocating ram and a follower mechanism comprising a pair of cooperating wedges mounted on said hinged tool holder controlled by said template, to vary the distance of said tool from the axis of the gear being machined during the movement of said ram and taking part in the angular adjustment of said ram relative to the gear being machined.

4. A machine tool for the machining of tooth flanks on spur and helical gears and producing deviations from the theoretical tooth shape along the width of the teeth, comprising in combination: a machine frame for supporting the gear to be maintained, a template fixedly attached to said frame, a ram reciprocatingly mounted on said frame, a tool carrier on said ram, a hinged tool holder pivotally mounted on said tool carrier for holding a tool to engage the gear to be machined in one direction of movement of said ram and a follower mechanism mounted in said hinged tool holder controlled by said template to vary the distance of said tool from the axis of the gear to be machined in the course of the movement of said ram in dependence upon the shape of said template, said follower mechanism comprises a wedge rail mounted axially slidable in said tool carrier, a wedge-shaped slide attached to said hinged tool holder in sliding contact with said wedge rail, said wedge rail and wedge-shaped slide when sliding upon one another turning said hinged tool holder relative to said tool carrier.

5. A machine tool as claimed in claim 4 wherein said follower mechanism comprises a threaded spindle connected to said wedge rail, a nut in screw engagement with said spindle journalled rotatably but restrained axially in said hinged tool holder, and a follower lever fixed to said nut and contacting said template.

6. A machine tool as claimed in claim 4 comprising a spring biasing said wedge rail always in the same direction relative to said hinged tool holder, thereby abolishing any play in said follower mechanism.

7. A machine tool as claimed in claim 4 comprising a member axially movable but restrained rotationally relative to said hinged tool holder and operatively connecting said threaded spindle to said wedge rail.

References Cited in the file of this patent

UNITED STATES PATENTS

| | | |
|---|---|---|
| 1,290,270 | Maag | Jan. 7, 1919 |
| 2,315,068 | Matthews | Mar. 30, 1943 |